United States Patent [19]

Ito

[11] Patent Number: 4,625,887
[45] Date of Patent: Dec. 2, 1986

[54] WATER-SEALED TYPE POT COMPRISING STEAM ESCAPE VALVE MEMBER

[75] Inventor: Motohiko Ito, Chiba, Japan

[73] Assignee: Taiyo Altight Kogyo Co., Ltd., Tokyo, Japan

[21] Appl. No.: 799,988

[22] Filed: Nov. 20, 1985

[51] Int. Cl.⁴ .................................. B65D 51/16
[52] U.S. Cl. ........................................ 220/231
[58] Field of Search .................... 220/231, 367; 126/299 C, 389

[56] References Cited

U.S. PATENT DOCUMENTS

| 3,047,186 | 7/1962 | Serio | 220/231 |
| 3,827,596 | 8/1974 | Powers, Jr. | 220/231 |
| 4,285,441 | 8/1981 | Ziskind | 220/231 |
| 4,298,131 | 11/1981 | Saito et al. | 220/231 |

Primary Examiner—George T. Hall
Attorney, Agent, or Firm—Wenderoth, Lind & Ponack

[57] ABSTRACT

A water-sealed type pot in which water can be retained between a flange portion at the upper portion of the pot body and its lid to obtain a sealing property. The lid includes a steam escape hole around which a valve seat is formed. Since a valve member is slidably provided on the valve seat, it can be selectively changed over between a position for opening the hole and a position for closing it. Although the valve member is pressed against the valve seat by a spring, it can rotate around the axis defined by the knob on the lid. In order to reduce friction during rotation, at least one of the slide surfaces of the valve member and of the valve seat is formed of polytetrafluoroethylene.

4 Claims, 5 Drawing Figures

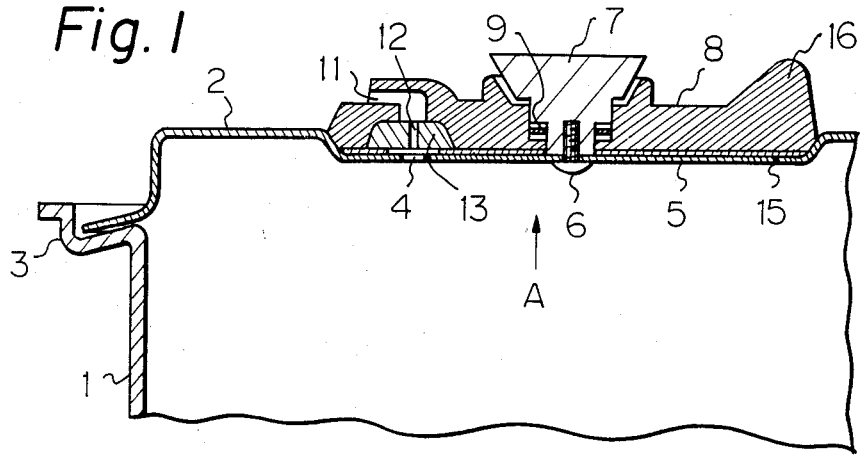
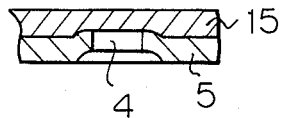
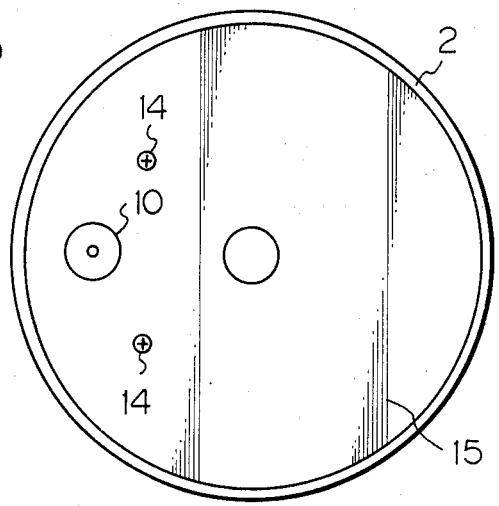

WATER-SEALED TYPE POT COMPRISING STEAM ESCAPE VALVE MEMBER

BACKGROUND OF THE INVENTION

1. Field of the Invention

This invention relates to a water-sealed type pot which is so arranged that a liquid may be retained between the flange portion of the pot body and the lid thereof.

2. Description of the Prior Art

A water-sealed type pot has previously been known, and its utility has been recognized since it is possible to perform cooking in a state wherein pressure is maintained at a certain level inside the pot without any need for using special mechanical devices. This effect of a water-sealed type pot can be obtained from the sealing property realized between the pot body and its lid, and it is a matter of course that the lid of the pot is not normally provided with a hole through which steam could escape. If this type of pot is capable of being selectively switched over to both the sealed state and the unsealed state, the usefulness of the pot is improved and it is further possible to provide the pot with other useful features. As an example, if the steam escape hole, which is provided in the lid, is capable of being selectively opened or closed, the pot may also be used for steam cooking in the state wherein the hole is open. Furthermore, the arrangement may be such that a whistle is attached to the lid which produces sound by virtue of the emission of steam when the water in the pot has boiled, wherein after the sound has been heard, the hole is closed so that the pot may be sealed. However, in the case where a valve mechanism is provided for the above-described switching operation, the valve mechanism has to be actuated by a weak force applied for a very short duration of time since the user is required to operate the valve mechanism with his finger at elevated temperatures as well. However, if such a requirement is to be satisfied, it has been impossible to realize a valve mechanism having complete sealing properties. This incomplete sealing capability is critically disadvantageous to a water-sealed type pot. Thus a practical water-sealed type pot has not yet been proposed which is equipped with a switching device for shutting off steam.

SUMMARY OF THE INVENTION

In view of the above circumstances, it is a primary object of the present invention to provide a water-sealed type pot which is equipped with a switching device for effectively shutting off steam.

To this end, the present invention provides a water-sealed type pot wherein a valve member is slidably provided on a valve seat which is formed at the periphery of a hole provided in the lid of the pot, or at a valve seat which is formed at the periphery of the outlet of the steam escape passage which communicates with the above-mentioned hole so that the hole of the lid or the outlet of the steam escape passage can be opened or closed by the valve member, at least the slide surface of the valve seat or that of the valve member being formed of polytetrafluoroethylene, whereby the above-described problems are solved.

The above and other objects, features and advantages of the present invention will become apparent from the following description of the preferred embodiment thereof, taken in conjunction with the accompanying drawings.

BRIEF DESCRIPTION OF THE DRAWINGS

In the drawings:

FIG. 1 is a fragmentary vertical cross section showing an embodiment of the water-sealed type pot in accordance with this invention;

FIG. 1A is a partially enlarged cross section showing a modified embodiment of the valve seat shown in FIG. 1;

FIG. 2 is a view taken in the direction of the arrow A, illustrating the valve member of the water-sealed type pot shown in FIG. 1;

DESCRIPTION OF THE PREFERRED EMBODIMENTS

Figure 3:
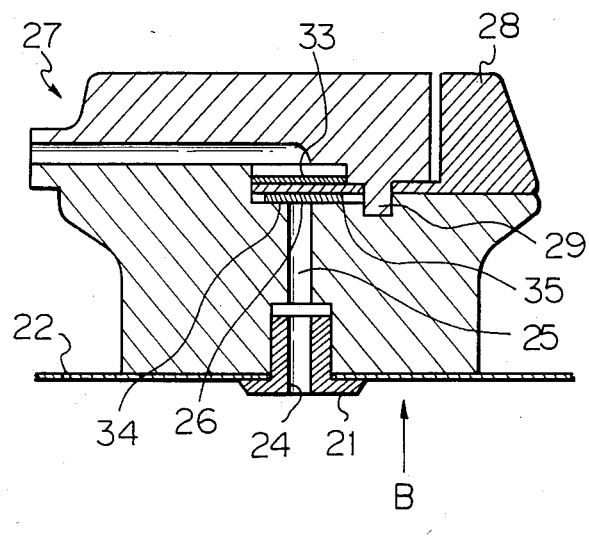
FIG. 3 is a partially enlarged vertical cross section, illustrating another preferred embodiment of the water-sealed type pot in accordance with this invention.

Referring to FIG. 1 showing one preferred embodiment of the pot in accordance with the present invention, reference numeral 1 denotes a pot body and reference numeral 2 a lid. A flange portion 3 of the pot has a portion which is inclined downwardly in the outward direction, the flange portion of the lid 2 also having a corresponding portion showing the same inclination, and water being retained between these flanges so that airtightness may be achieved. Alternatively water may be retained by a shallow groove formed along the peripheral portion of the flange portion of the pot body 1. Arrangements whereby this type of water sealing can be obtained are conventional and do not constitute the present invention.

The lid 2 is provided with a hole 4 which allows the passage of steam, and is formed with a circular recessed region which includes the hole 4 such as to define a valve seat 5. A stud bolt 6 is fixed at the center of the lid 2 and a knob 7 is screwed to the stud bolt 6. A valve member 8 having a generally disc-shaped top view is arranged such that it is capable of rotating about the knob 7, being pressed against a valve seat 5 by a wave-shaped spring 9 which is inserted between the knob 7 and the valve member 8. An outlet 11 through which steam passes is formed in the valve member 8, which is equipped with a whistle 13 having a steam flow passage 12 communicating with the outlet 11. As can be seen from FIG. 2, a sealing sheet 15 made of polytetrafluoroethylene, known by the tradename "Teflon", is attached to the bottom surface of the valve member 8 by a small screw 14. The sealing sheet 15 has an opening 10 so as not to block the steam flow passage 12 of the whistle 13.

In FIG. 1, the valve member 8 is located in the position whereby the hole 4 is opened, and whereby sound can be produced by the passage of steam jetted out of the hole 4 and forced through the whistle 13 before passing through the outlet 11, thus providing a warning of the boiling of water. In this state, when the valve member 8 is rotated through a predetermined angle while pushing against a tab 16, the sealing sheet 15 closes the hole 4 to seal the pot. During the rotating operation of the valve member 8, the constituent material for the seal sheet 15, polytetrafluoroethylene, acts to reduce the friction between the slide surfaces of the valve member 8 and the valve seat 5, thereby enabling the valve member 8 to be moved by a small force, and the hole 4 is further positively closed by the action of the elastic deformation properties of the sealing sheet 15. It is a matter of course that this sealing sheet 15 may be secured to the side of the valve seat 5 in order to obtain the same function. In this latter case, a hole corresponding to the hole 4 should also be provided in the sealing sheet 15 such that the sealing sheet 15 does not directly cover the hole 4, the hole 4 being closed by virtue of being surrounded by the side wall of the hole of the sealing sheet and the bottom surface of the valve member 8. It is to be noted that a maximum level of sealing effect can be obtained in a case where, as in the illustrative embodiment shown in FIG. 1, the sealing sheet 15 is attached to the bottom surface of the valve member 8 so that it may directly cover the hole 4, and, as shown in FIG. 1A, the material for the lid is raised at the periphery of the hole 4 so as to elevate the contact pressure against the sealing sheet 15.

Figure 4:
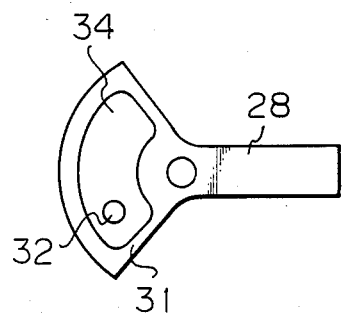
FIG. 4 is a view taken in the direction of the arrow B, illustrating the valve member employed in the embodiment shown in FIG. 3.

Referring to FIG. 3, which shows only the portion of the valve mechanism of another preferred embodiment in accordance with the present invention, the hole in a lid 22 is defined by a hole 24 formed in a metal screw 21 onto which is screwed a knob 27 which is so designed as to be attached to the lid 22 by thus being screwed on the screw 21. This knob 27 is provided with a steam escape passage 25 which communicates with the hole 24 in the state wherein the knob 27 is attached to lid 22. The surface portion surrounding an outlet 26 is evenly shaped to constitute a valve seat 35. The outlet 26 is arranged such as to be opened or closed by a valve member 28 which is so attached as to be capable of performing an angular motion about a post 29, and the bottom surface of the valve member, as shown in FIG. 4, is provided with a sealing sheet 34 made of polytetrafluoroethylene. A through hole 32 is formed in a sectorial portion 31 of the valve member 28 such that it further extends through the sealing sheet 34, and in this arrangement the steam is capable of escaping from the pot by effecting an angular motion on the valve member 28 such as to bring the through hole 32 into alignment with the outlet 26. The pot of this invention can in this state be used for steam cooking, etc. The valve member 28 is pressed downwardly by a plate spring 33, so that the sealing sheet 34 covers and positively seals the outlet 26 in other angular positions. In this embodiment, the sealing sheet 34 does not cover the entirety of the bottom surface of the valve member 28. However, a polytetrafluoroethylene sheet is provided in a portion to which a larger pressure is applied by the plate spring 33 so that the resistance to the rotation of the valve member 28 is materially reduced, thereby enabling the valve member 28 to be actuated by a small force.

Accordingly, this invention offers an advantage in that a user can actuate by a small force the valve member which controls the opening and closing of the passage which allows the steam to escape out of the pot, whereby the user can safely operate the valve member at hot temperatures during cooking. Additionally, this invention does not lose the advantage of a water-sealed type pot in that complete sealing can be obtained while the passage which allows the escape of steam is kept closed.

What is claimed is:

1. A water-sealed type pot which is arranged such that water is retained between a flange portion at the upper portion of a pot body and a lid thereof, said lid being provided with a hole through which steam is jetted out, the pot comprising:
    a valve seat formed at the periphery of said hole; and
    a valve member slidably provided on said valve seat in such a manner that it may be changed over between a position wherein said hole is closed and a position wherein said hole is opened,
    said valve member being pressed against said valve seat by the action of a spring;
    and at least one of the slide surfaces of said valve member and of said valve seat being formed of polytetrafluoroethylene.

2. A water sealed-type pot according to claim 1, wherein said valve member is arranged in such a manner that it may rotate about a knob on the lid of said pot.

3. A water sealed-type pot according to claim 1, wherein the slide surface of said valve member is formed of polytetrafluoroethylene and the portion at the periphery of the hole of said valve seat is raised.

4. A water-sealed type pot which is arranged such that water is retained between a flange portion at the upper portion of a pot body and a lid thereof, the pot comprising:
    a member secured to said lid and having a steam escape passage extending through said lid;
    a valve seat formed at the outlet of the steam escape passage;
    a valve member slidably provided on said valve seat in such a manner that it may be changed over between a position wherein said outlet is closed and a position wherein said outlet is opened,
    said valve member being pressed against said valve seat by the action of a spring;
    and at least one of the slide surfaces of said valve member and of said valve seat being formed of polytetrafluoroethylene.

* * * * *